United States Patent [19]

Cottrell et al.

[11] Patent Number: 4,691,945
[45] Date of Patent: Sep. 8, 1987

[54] CONDUIT COUPLINGS

[75] Inventors: Henry L. Cottrell, 4168 W. Fallon, Fresno, Calif. 93722; William L. Venturi, Oakhurst, Calif.

[73] Assignee: Henry Lloyd Cottrell, Fresno, Calif.

[21] Appl. No.: 926,050

[22] Filed: Oct. 31, 1986

[51] Int. Cl.$^4$ .............................................. F16L 21/06
[52] U.S. Cl. ................................... 285/419; 285/424; 285/903
[58] Field of Search ............... 285/419, 903, 373, 424

[56] References Cited

U.S. PATENT DOCUMENTS

| | | |
|---|---|---|
| 292,306 | 1/1984 | Hawley . |
| 704,936 | 7/1902 | Scherer . |
| 1,836,336 | 12/1931 | Replogle . |
| 2,937,893 | 5/1960 | Hill .................................... 285/328 |
| 3,239,254 | 3/1966 | Campbell ...................... 285/419 X |
| 3,298,721 | 1/1967 | Wiley ............................. 285/424 X |
| 3,572,394 | 3/1971 | Davis ............................. 285/424 X |
| 3,782,763 | 1/1974 | Henrickson ........................ 285/414 |
| 4,155,574 | 5/1979 | Hulsey ........................... 285/373 X |

FOREIGN PATENT DOCUMENTS 515777 12/1952 Belgium .
419752 4/1947 Italy .

*Primary Examiner*—Dave W. Arola
*Attorney, Agent, or Firm*—Townsend and Townsend

[57] ABSTRACT

A coupling for circular spiral lock seam conduit sections is comprised of a band curved to encircle the conduit, preferably with overlapping ends, a groove running along the interior of the band of sufficient cross section to receive the spiral lock seam, and clamps for tightening the band around the conduit sections. The groove runs at an angle along the band to form a spiral when the band is curved around the conduit sections, which mates with the spiral of the lock seam. The width of the groove exceeds that of the lock seam so that when the band is tightened the groove will shift laterally, sealing one side of the groove against the facing side of the lock seam. Other features are included to provide the maximum degree of sealing around the entire circumference of the conduit sections.

13 Claims, 9 Drawing Figures

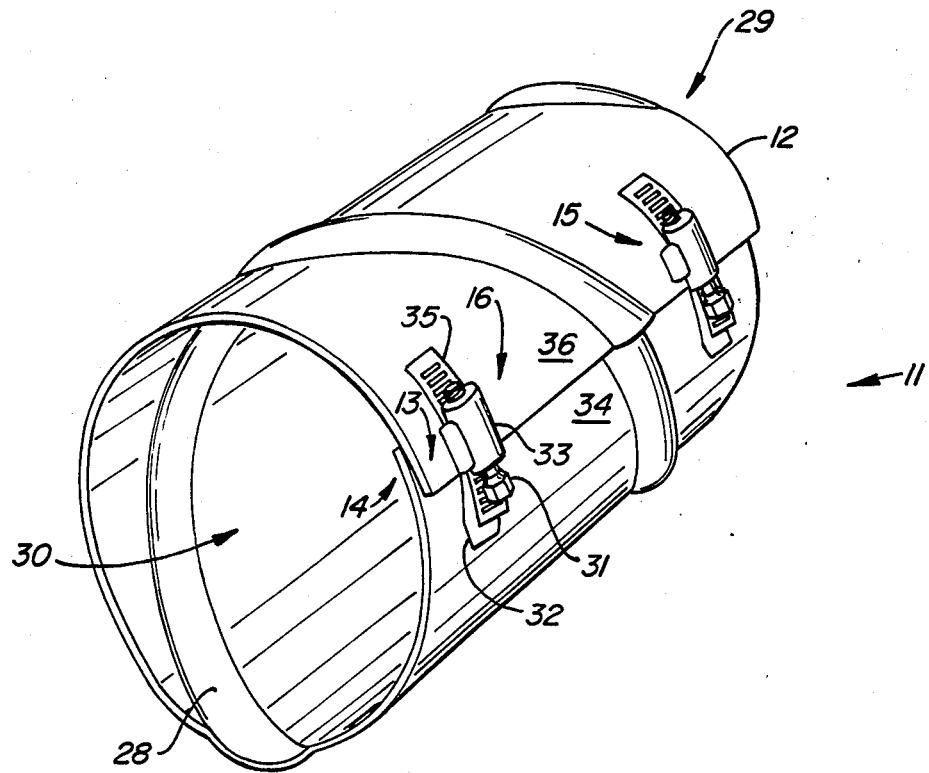
FIG._1.
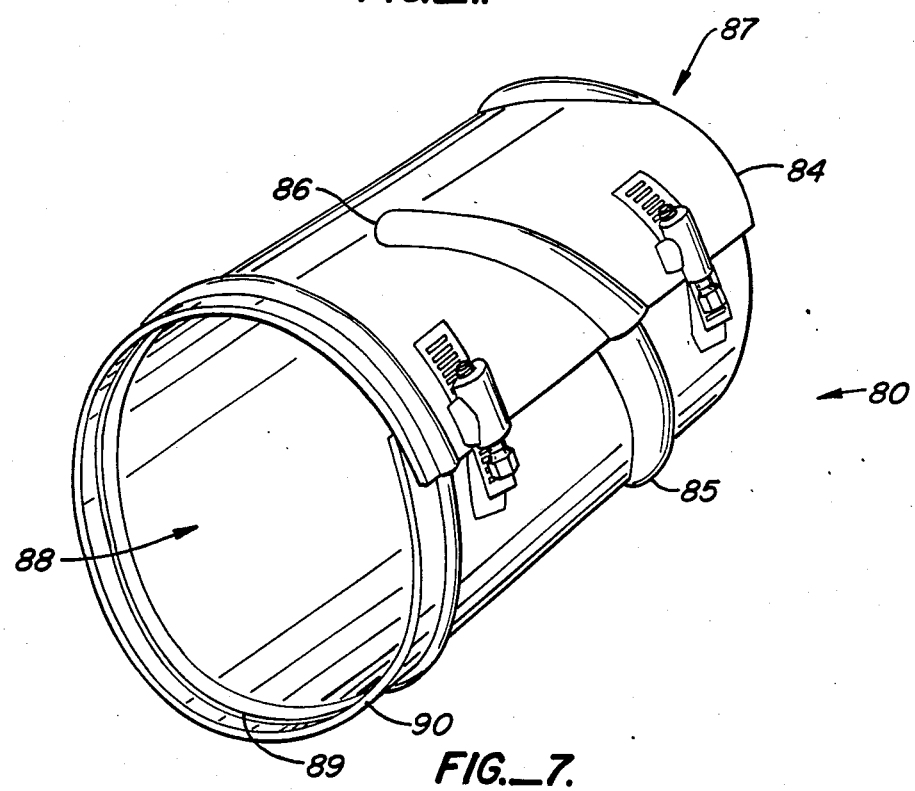
FIG._7.

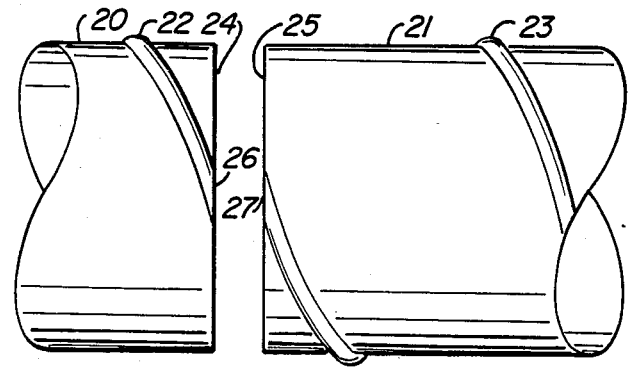
FIG._2.
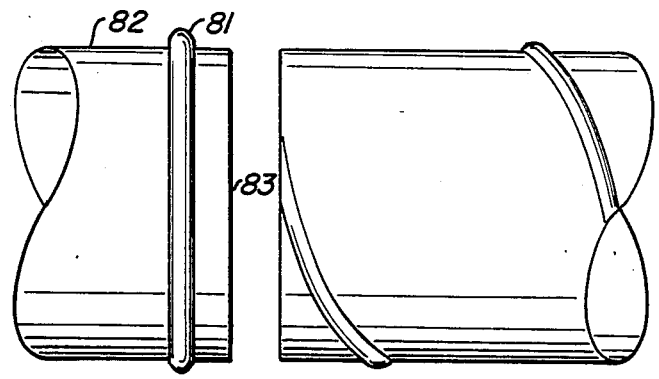
FIG._8.

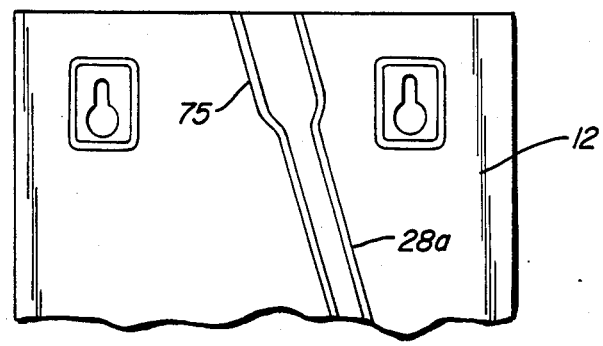
FIG._6.
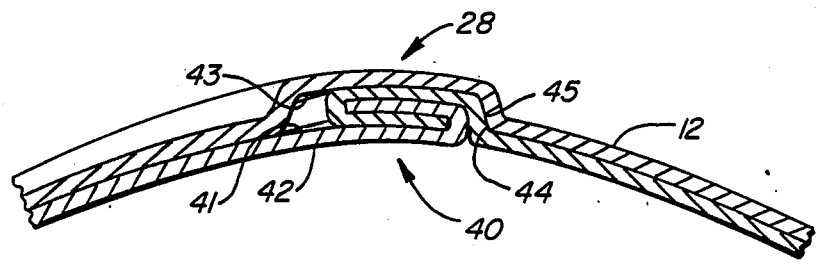
FIG._3.

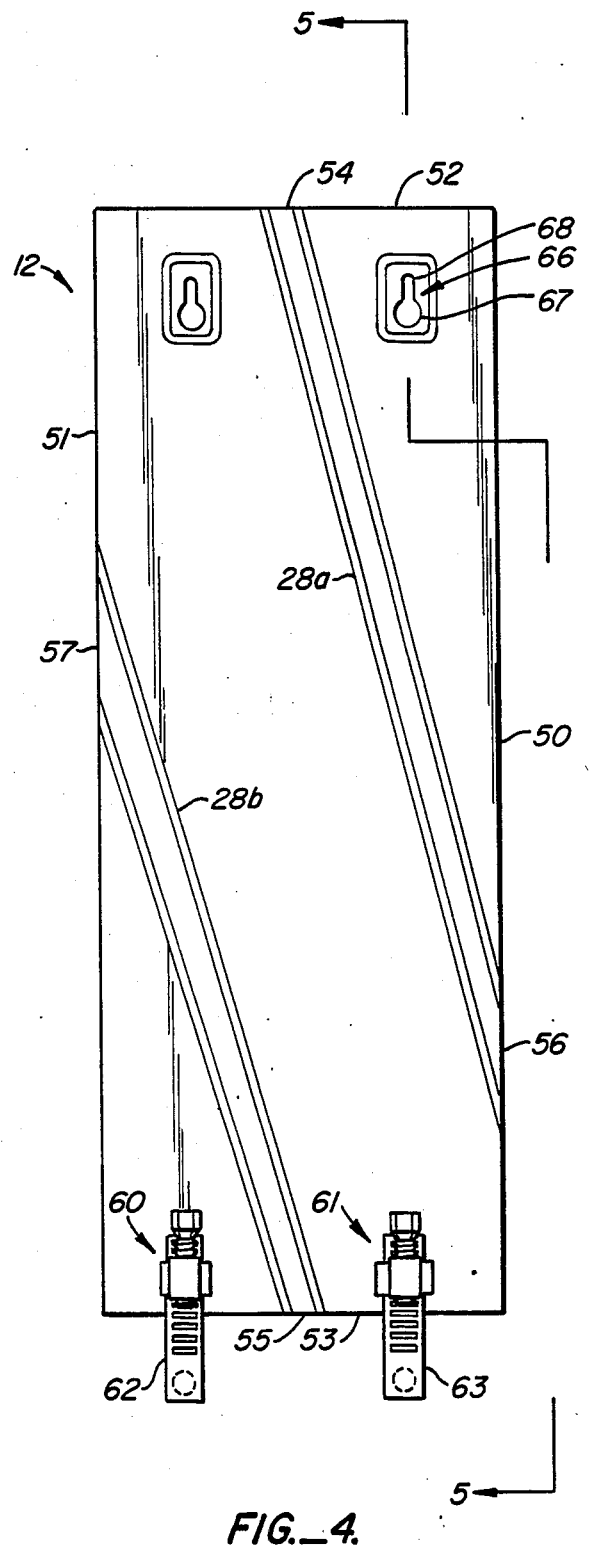
FIG._4.
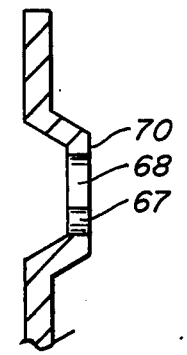
FIG._5.

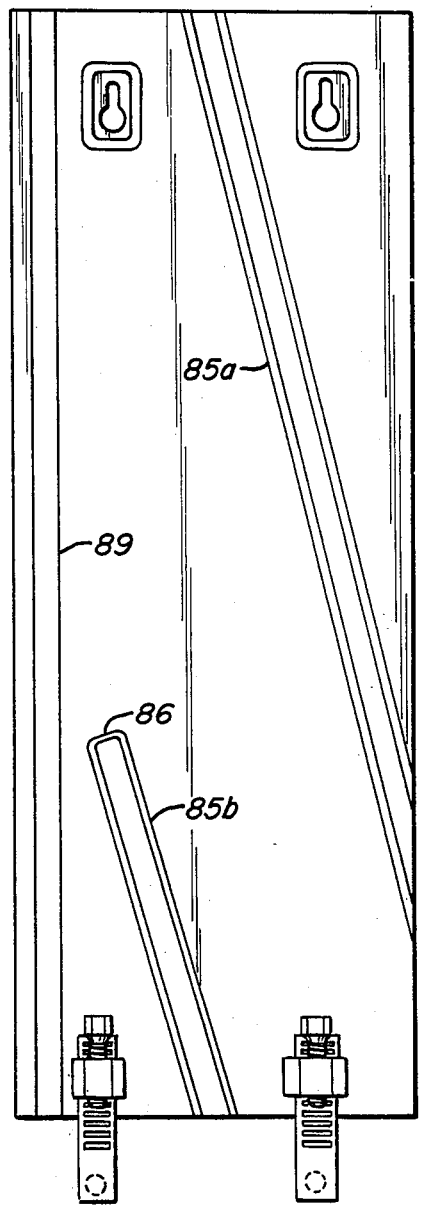
FIG._9.

CONDUIT COUPLINGS

BACKGROUND OF THE INVENTION

This invention relates to conduits such as those used in pneumatic conveying systems. Examples of such systems are fume exhaust systems, dust conveying systems, and ducting used in association with cotton gins. In particular, this invention relates to the coupling of conduit sections.

Conduits formed from sheet metal are widely used in pneumatic conveying systems. These conduits range in diameter from about 3 inches to about 80 inches (8–203 cm), and are formed by rolling sheet metal and joining the abutting edges by any of a number of conventional processes, some such as welding to produce a seamless product, and others such as rolling to produce a protruding seam. The formation of lock seams by the rolling is particularly efficient since it provides a strong reliable airtight seal in an efficient manner.

While lock seam tubing may be made with a straight seam following the axis of the tubing, a seam which spirals around the tubing has the advantage of permitting tubing of a wide range of diameters to be formed from a single width of sheet metal strip. Spiral lock seam tubing, however, presents a problem when sections of such tubing are joined end-to-end. In pneumatic conveying systems, the joints must be airtight to avoid loss of pressure inside the conduit and leakage to the surrounding atmosphere, particularly when superatmospheric pressures are present inside the conduit lines. The lock seam forms an irregularity in the surface contour of the conduit section which continues to the end edge. As a result, a simple circular clamping band will not provide a seal all the way around.

While the sealing problem may be approached by sealing on the conduit side opposite the side from which the lock seam protrudes, this is a disadvantage in certain conveying systems, such as those where material such as fibers is being conveyed. Such materials tend to catch on any protrusions on the inside surface of the conduit, thereby raising a risk of plugging inside the conduit or restricting the flow.

A further problem with internal couplings is the installation of such couplings when there is little clearance between the conduit sections. Internal couplings cannot be used when the space into which a conduit section is to be inserted lacks sufficient clearance in the lengthwise direction to permit insertion of the coupling end into the open end of the adjacent fitting or conduit.

SUMMARY OF THE INVENTION

The present invention resides in a coupling for spiral lock seam conduits with outward protruding seams. The coupling is formed from a band curved to encircle the abutting ends of the conduits, the band containing a groove angled to fit over the spiral lock seam when the band is curved around the conduits, and a fastener to maintain the curvature of the band and to tighten it around the abutting conduit ends. In various embodiments of the invention, the groove is wider in cross section than the width of the lock seam so that tightening of the band forces one side wall of the groove against one side of the protruding lock seam. When the depth of the groove is equal to or less than the height of the lock seam above the outer surface of the conduit, a tight seam may be formed along both the top and one side of the lock seam as the band is tightened.

In further embodiments of the invention, the band is of sufficient length to encircle the abutting conduit ends with the ends of the band overlapping and grooves terminating the overlapping ends aligning with each other to form a continuous spiral. The groove on the outer overlapping end may be expanded to achieve nesting of the overlapping grooves, thereby accommodating the thickness of the band.

The coupling of the present invention forms an airtight seal around the full circumference of spiral lock seam conduits, and the seal is tightened by constricting the band from which the coupling is formed. The coupling has the further advantage of being slidable (by rotation) back over the conduit surface when not in use, to retract the coupling so that the conduits may be inserted in spaces with minimal clearance at the ends. The coupling is fully external to the conduits, offering no obstruction to flow through the conduit interior.

The invention further resides in an adapter coupling for use in joining a spiral lock seam conduit with a conventional conduit having an annular clamping bead adjacent to its open end. The adapter is similar to the coupling above described, except that the groove is truncated at a point between the side edges of the band, and an annular groove is formed adjacent the end beyond the truncation point of the spiral groove.

BRIEF DESCRIPTION OF THE DRAWINGS

FIG. 1 is a perspective view of one example of a coupling in accordance with the present invention, for joining the abutting ends of two sections of spiral lock seam tubing.

FIG. 2 is a side elevation of the abutting ends of a pair of spiral lock seam tubing sections which may be joined by the coupling shown in FIG. 1.

FIG. 3 is a sectional view of a spiral lock seam tubing fitted with a coupling in accordance with the present invention.

FIG. 4 is a plan view of the coupling band of FIG. 1 in flattened form.

FIG. 5 is an enlarged side view of the flattened coupling band portion of FIG. 4, taken along the line 5—5 thereof.

FIG. 6 is a plan view of an end portion of a flattened coupling band in accordance with the present invention, showing an alternative configuration.

FIG. 7 is a perspective view of a second example of a coupling in accordance with the present invention, for joining the abutting ends of one section of spiral lock seam tubing with a conventional conduit section of equal diameter with an annular bead.

FIG. 8 is a side elevation of the abutting ends of the spiral lock seam tubing section and the conventional annular bead conduit section which may be joined by the coupler of FIG. 7.

FIG. 9 is a plan view of the coupling of FIG. 7 in flattened form.

DETAILED DESCRIPTION OF THE INVENTION AND PREFERRED EMBODIMENTS

The coupling 11 shown in FIG. 1 is formed from a band 12 curved into the form of a cylinder with overlapping ends 13, 14. A pair of clamps 15, 16 hold the overlapping ends together. The band 12 may be segmented or continuous. A continuous band is shown.

The cylinder formed by this curved band 12 is of sufficient diameter to accommodate the conduit sections 20, 21 shown in FIG. 2. These conduit sections are spiral lock seam tubing, the lock seams 22, 23 protruding outward. The abutting ends 24, 25 of these conduit sections are shown slightly parted in FIG. 2, but will be in actual contact (or very close) when the coupler is fitted over them like a sleeve and tightened into place. The two sections will be oriented as shown so that the ends 26, 27 of the lock seams 22, 23 will be aligned, thereby forming a continuous spiral.

Returning to FIG. 1, a groove 28 of sufficient size to fully surround the spiral lock seams 22, 23 of the conduit sections (FIG. 2) is formed in the band 12. The groove 28 runs along the band 12 at an angle to form a spiral of the same pitch as the spiral formed by the lock seams. With the overlapping ends 13, 14 of the band 12 joined as shown, the groove forms a continuous spiral extending from one open end 29 of the sleeve formed by the band through the overlapping portions 13, 14 to the other open end 30. Depending on the pitch of the lock seam spiral of the conduit sections, the groove 28 will form a sufficient number of revolutions around the coupling to provide the coupling with a length sufficient for effective clamping. It is preferred that the groove form at least one full revolution as shown.

When not in use, the coupling may be loosely placed over a spiral lock seam conduit and retracted back over the conduit by rotation in the direction of the spiral to draw the coupling back so that it does not protrude over the conduit end. This enables one to place a conduit with coupling attached into a close space between adjacent fittings on either side. Once the conduit is in place, the coupling can be rotated in the opposite direction to travel back toward the abutting edges. Once there, the coupling is tightened to form a seal.

The clamps 15, 16 may be of any conventional construction which is capable of being tightened to constrict the band around the conduit sections. Examples include draw-pull clamps, toggle clamps, and adjustable clamps. The clamps shown in FIG. 1 are adjustable clamps and are similar in construction to conventional hose clamps. The parts include a screw 31 secured to an anchoring strip 32 through a mounting sleeve 33. The anchoring strip 32 is welded to the outer surface 34 of one end 14 of the band 12. An opening under the mounting sleeve 33 (not shown) permits the passage of a slotted strip 35 which is welded to the outer surface 36 of the other (overlapping) end 13, the threads of the screw engaging the slot. As the screws turn, the slotted strip 35 is drawn over through the opening under the screw mounting sleeve 33 and the band 12 is tightened around the abutting conduit ends inside.

FIG. 3 provides an enlarged sectional view of an arc of the coupling in place over a lock seam conduit. The lock seam 40 shown in this drawing is of conventional configuration, protruding outward from the exterior surface 41 of the conduit 42. In the embodiment shown, the groove 28 fully encompasses the protruding lock seam 40. Contact of the inner back wall 43 of the groove with the lock seam 40 is assured by limiting the depth of the groove to the height of the lock seam above the exterior conduit surface 41. The width of the groove, however, exceeds that of the lock seam. As the coupling band 12 is tightened over the conduit 42, the groove 28 will shift laterally with respect to the lock seam 40 until one inner side wall 44 of the groove is forced against the facing side 45 of the lock seam, forming a further seal in addition to the one between the inner back wall 43 of the groove and the top surface of the lock seam.

FIG. 4 shows the coupling band 12 of FIG. 1 in flattened form, incorporating a second embodiment of the clamps. This view shows that the groove 28 of FIG. 2 is actually two grooves 28a and 28b running parallel, each extending from one of the side edges 50, 51 of the band to one of the end edges 52, 53. At the end edges, the mouths of the grooves 54, 55 are aligned to overlap when the band is curved into a cylinder as shown in FIG. 1. The mouths of these grooves at the side edges 56, 57 are open to receive the lock seams.

The clamps 60, 61 shown in FIG. 4 are a modified version of those shown in FIG. 1. The slotted strips 62, 63, rather than being welded to one of the overlapping ends of the band as in FIG. 1, are securable thereto in a detectable manner by a keyhole-type arrangement. Enlarged side views of the clamp are shown in FIG. 5.

Extending from one end of the slotted strip 63 as shown in FIG. 5 is a peg 64 with an enlarged head 65. The keyhole 66 at the other end of the band contains an opening 67 of sufficient size to permit entry of the enlarged head 65. Extending from the hole is a slot 68 of sufficient width to permit passage of the peg 64 while smaller than the head 65. The head 65 is thus inserted into the broad end 67 of the keyhole, and the screw 69 is tightened, pulling the slotted strip 63 backward and drawing the peg 64 into the slotted region 68 of the keyhole, thereby anchoring the slotted strip 63 therein and applying tension to tighten the band. As shown in the upper portion of FIG. 5, the region 70 of the band surrounding the keyhole may be raised to prevent the peg head 65 from pressing against the exterior surface of the underlying conduit section. Full contact between the coupling band and the conduit is thus maintained.

A variation in the groove construction is shown in FIG. 6. Here, the portion of the groove at the end edge 52 of the band which is the outermost of the overlapping ends is expanded to a width greater than the remainder of the groove 28a. This expanded portion 75 compensates for the thickness of the sheet stock from which the coupling band 12 is formed. The concave surface (not shown) of this expanded portion is thus broad enough to encompass the entire outer convex surface of the groove at the other end edge of the band so that the two grooves will nest together snugly when the bands are overlapped.

The coupling 80 in FIG. 7 is an adapter or combination-type coupling designed to permit the airtight joining of a spiral lock seam conduit with a welded conduit having an annular bead. Two such conduits are shown in FIG. 9. The annular bead 81 forms a protruding ring or flange around the welded conduit 82 in close proximity to the abutting end 83.

Returning to FIG. 7, the cylindrical sleeve 84 formed by the clamping band contains a spiral groove 85 similar to that shown in the embodiment in FIG. 1. The spiral groove 85 in FIG. 4, however, is truncated at a termination point 86 between the two ends 87, 88 of the sleeve 84. The groove thus extends to only one sleeve end 87. Between the termination point 86 of the groove and the other sleeve end 88 is a transverse groove 89 running parallel to the side edge 90 of the clamping band, and thus forming a circle around the sleeve 84 and coaxial therewith. The transverse groove 89 fits over the annular bead 81 on the welded conduit 82, forming an airtight seal when clamped down. Although not shown in the drawing, the outer overlapping portion of the transverse groove may be expanded to provide full nesting of the curves when the clamps are tightened.

The plan view of FIG. 9 shows the coupling 80 of FIG. 7 in flattened form. Here again the spiral groove 85 is shown to consist of two parallel grooves 85a, 85b.

The foregoing is offered primarily for purposes of illustration. It will be readily apparent to those skilled in the art that variations and modifications in the elements of structure and operation described herein may be introduced without departing from the spirit and scope of the invention.

What is claimed is:

1. A coupling for conduits at least one of which is circular tubing having a spiral lock seam protruding outward, said coupling comprising:
   a band curved to encircle said circular tubing;
   a groove in said band to receive said spiral lock seam and angled to align therewith, said groove having a depth not greater than the distance by which said spiral lock seam protrudes from said circular tubing and a width having a substantially uniform depth exceeding the width of said spiral lock seam to define a gap between said groove and said spiral lock seam on one side of the latter which permits shifting of said groove over said spiral lock seam in a direction transverse to said groove upon tightening said band around said circular tubing; and
   means for tightening said band around said circular tubing.

2. A coupling in accordance with claim 1 comprising a plurality of said grooves running parallel and spaced to form a continuous spiral aligned with said spiral lock seam.

3. A coupling in accordance with claim 1 in which said band is comprised of a pair of end edges and a pair of side edges and said coupling includes a pair of said grooves running parallel, each said groove extending from one of said end edges to one of said side edges to form a continuous spiral.

4. A coupling in accordance with claim 1 in which said band is comprised of a pair of end edges and a pair of side edges and is of sufficient length to encircle said circular tubing with said end edges overlapping.

5. A coupling in accordance with claim 1 in which said groove is comprised of a depression along an inner surface of said band backed by a ridge along an outer surface of said band, said coupling comprising a pair of said grooves running parallel and overlapping at said end edges, the overlapping portion of one of said grooves being expanded to a width exceeding the width of the ridge of the overlapping portion of the other of said grooves.

6. A coupling in accordance with claim 1 in which said band defines a sleeve of sufficient diameter to encircle said circular tubing, and said groove forms a spiral around said sleeve.

7. A coupling in accordance with claim 6 in which said groove forms at least one full revolution around said sleeve.

8. A coupling in accordance with claim 6 in which said sleeve terminates at first and second sleeve ends along the axis thereof and said groove extends from said first sleeve end to said second sleeve end.

9. A coupling in accordance with claim 1 in which said tightening means is comprised of an adjustable link connecting opposing end edges of said band.

10. A coupling in accordance with claim 9 in which said adjustable link is a screw-tightenable link.

11. A coupling for circular tubing conduits having spiral lock seams protruding outward, said coupling comprising:
    a band curved with ends overlapping to form a sleeve of sufficient diameter to encircle said circular tubing conduits;
    an elongate undulation in said band forming a spiral around said sleeve, said undulation defining a trough along the inner surface of said sleeve having a width of substantially uniform depth exceeding width of said spiral lock seam to define a gap between said trough and said spiral lock seam on one side of the latter which permits shifting of said groove over said spiral lock seam in a direction transverse to said groove upon tightening said band around said circular tubing, and a ridge along the outer surface of said sleeve over said trough, said spiral angled to align with said spiral lock seam and extending the full length of said sleeve to open at each end thereof;
    a screw-tightenable link joining said overlapping ends to tighten said sleeve over said circular tubing conduits.

12. A coupling for joining a first circular tubing conduit having a spiral lock seam with a second circular tubing conduit having an annular bead, said coupling comprising:
    a band curved with ends overlapping to form a sleeve having first and second open sleeve ends for receiving said first and second circular tubing conduits respectively;
    an elongate undulation in said band forming a spiral around said sleeve, said undulation defining a trough along the inner surface of said sleeve having a width exceeding that of said spiral lock seam, and a ridge along the outer surface of said sleeve over said trough; said spiral angled to align with said spiral lock seam, commencing at said first sleeve end and terminating at a termination point between said first and second sleeve ends;
    a transverse groove in said band along the inner surface of said sleeve between said termination point and said second sleeve end, said transverse groove forming a circle to receive said annular bead and
    means for tightening said band around said to first and second circular tubing conduits.

13. A coupling for joining a first circular tubing conduit having a spiral lock seam with a second circular tubing conduit having an annular bead, said coupling comprising:
    a band curved to define a sleeve of sufficient diameter to encircle said circular tubing, said sleeve terminating at first and second sleeve ends;
    a spiral groove in said band to receive said spiral lock seam and angled to align therewith, said spiral groove extending to said first sleeve end and truncated at a termination point between said first and second sleeve ends;
    a transverse groove in said band perpendicular to the axis of said sleeve to form a circle therearound between said termination point and said second sleeve end to receive said annular bead and means for tightening said band around said to first and second circular tubing conduits.

* * * * *